United States Patent
Treutlein

(10) Patent No.: US 6,515,056 B2
(45) Date of Patent: Feb. 4, 2003

(54) PACKAGING FILMS

(75) Inventor: Roland Treutlein, Tomils (CH)

(73) Assignee: EMS-Inventa AG, Zurich (CH)

( * ) Notice: Subject to any disclaimer, the term of this patent is extended or adjusted under 35 U.S.C. 154(b) by 0 days.

(21) Appl. No.: 09/839,192

(22) Filed: Apr. 19, 2001

(65) Prior Publication Data

US 2001/0031810 A1 Oct. 18, 2001

Related U.S. Application Data

(63) Continuation of application No. 09/566,459, filed on May 8, 2000, now abandoned, which is a continuation of application No. 08/947,695, filed on Oct. 9, 1997, now abandoned.

(30) Foreign Application Priority Data

Oct. 9, 1996 (DE) .......................................... 196 41 659

(51) Int. Cl.[7] .............................. C08J 3/22; C08K 5/20; C08K 3/26; C08K 3/34
(52) U.S. Cl. ........................ 524/227; 524/227; 524/451; 524/425; 524/606
(58) Field of Search ................................ 524/227, 425, 524/606, 451; 523/351

(56) References Cited

U.S. PATENT DOCUMENTS

| 2,948,698 | A | * | 8/1960 | Cocci |
| 3,342,762 | A | * | 9/1967 | Crovatt |
| 3,755,221 | A | * | 8/1973 | Hitch |
| 4,187,212 | A | * | 2/1980 | Zinke et al. |
| 4,237,034 | A | * | 12/1980 | Tonka et al. .................... 525/2 |
| 4,278,576 | A | * | 7/1981 | Goldman |
| 4,490,324 | A | * | 12/1984 | Mollison .................... 264/211 |
| 4,749,736 | A | * | 6/1988 | Khanna et al. ............. 524/230 |
| 4,831,061 | A | * | 5/1989 | Hilaine et al. ................ 521/56 |
| 4,866,115 | A | * | 9/1989 | Betz et al. ................... 529/135 |
| 4,877,684 | A | * | 10/1989 | Sheperd et al. ............. 524/351 |
| 5,109,049 | A | * | 4/1992 | Sheperd et al. ............. 523/351 |
| 5,175,051 | A | * | 12/1992 | Schaegl ...................... 428/323 |
| 5,298,546 | A | * | 3/1994 | Kirsch et al. ............... 524/423 |
| 5,439,946 | A | * | 8/1995 | Klumperman et al. ........ 521/77 |

FOREIGN PATENT DOCUMENTS

| EP | 0662534 | * | 7/1995 |
| JP | 6-240134 A | | 8/1994 |
| JP | 8-113639 A | | 5/1996 |

* cited by examiner

Primary Examiner—Peter Szekely
(74) Attorney, Agent, or Firm—Marshall & Melhorn, LLC

(57) ABSTRACT

A packaging film is made from a master-batch on a polyamide base. The preferred polyamide base is copolyamide 6/12. The packaging films made from this master-batch exhibit improved slip properties and anti-blocking properties. The packaging films are particularly suitable for use in automatic packaging machines in order to increase the cycle frequencies in the are of foodstuff packaging.

7 Claims, 1 Drawing Sheet

PACKAGING FILMS

Figure 1:
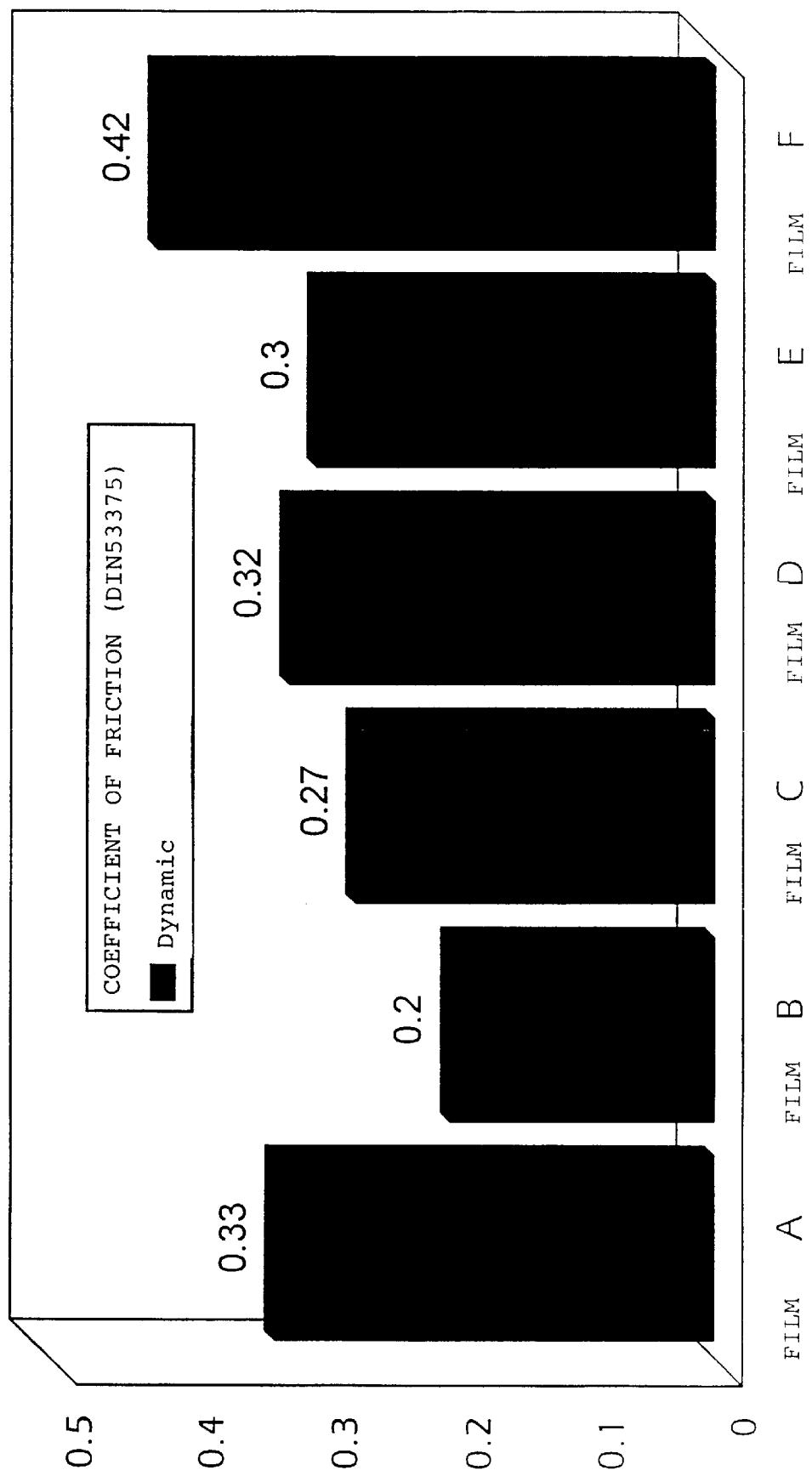

This Application is a continuation of U.S. Pat. application Ser. No. 09/566,459, filed on May 8, 2000, now abandoned, which is a continuation of U.S. Pat. application Ser. No. 08/947,695, filed on Oct. 9, 1997, now abandoned. U.S. Pat. application Ser. No. 08/947,695 was pending as of the filing date of application Ser. No. 09/566,459, and U.S. application Ser. No. 09/566,459 was pending as of the filing date of this application.

The invention relates to a master-batch on a polyamide base, and to its use.

In the plastics processing industry the use of master-batches is widely known for achieving desired properties such as pigmentation, anti-static provision, anti-blocking function, flow promotion, etc.

Master-batches are used as, in comparison to pure additives, they offer a series of advantages such as clean handling, precise metering, clearly reduced risk of de-mixing, simple combination of various additives and rapid uniform distribution of the additives in the polymer compound.

As a rule there is used, as a carrier material for the additives in the master-batch, the base material coming into consideration in the on a polyamide base, or a material compatible with this base material.

Although master-batches are also widely used in processing polyamides, and provide a satisfactory solution to partial problems, until now no master-batch could be prepared based on a polyamide which can fulfil the following problem solutions and market requirements in one single master-batch material:

a) carrier material and base material identical and compatible b) anti-blocking functions c) increased slip property of the article produced (improved surface slip)

d) additives resistant to sterilisation.

Until the present, a polyamide master-batch has been known from U.S. Pat. No. 5,109,049 (American National Can Company), which offers anti-blocking functions, but affords no advantages as regards slip properties.

There is described by the company Hoechst in EP 0 662 534 A1 a special polyamide master-batch which is preferably suitable for pigmenting aromatic polyamide fibres and shaped structures.

Until today no single master-batch could be found on the market which is particularly suitable for the manufacture of films, and unifies the following properties in one single product:

extremely good compatibility with the base material and admixture without impairing the most important properties of the film, such as mechanical strength, barrier effect, optical properties uniform crystallinity of the film outstanding slip property of the film assured anti-blocking properties resistance to sterilisation permitted for foodstuffs.

With respect to the improved slip property of films, these properties are increasingly demanded by the market, as new automatic packaging machines, particularly for packaging meat and cheese, require a high degree of slip property in order to increase the machine cycle frequencies. In the new automatic packaging machines (deep-drawing systems), the maximum possible cycle frequencies are predetermined by the running or sliding capacity of the films.

The meat and cheese portions to be packaged are in addition becoming increasingly large and heavy, which imposes increased demands on the packaging films.

The market demands as a measurement value for the polyamide layer of packaging films a dynamic coefficient of friction (COF) of 0.2 in accordance with DIN 53375.

In addition to this low coefficient of friction, the market also demands that all the further abovenamed properties be likewise contained in a single master-batch.

If the entire required spectrum of properties has to be combined by various master-batches or also in combination with additives, this is extremely complex, often impossible, but certainly more cost-intensive, as this requires a correspondingly-designed infrastructure of the production systems.

It would be extremely desirable for the packaging industry and particularly for the manufacturers of packaging films to have for the production of polyamide films one single master-batch which produces films with the following advantages:

clear advantages in further processing of films due to better slip properties and shorter packaging cycles on packaging machines, no tendency for the film to block, particularly in the case of copolyamides, which tend to adhere, absolute reliability in sterilisation without uncontrolled blooming, adjustment of the required film performances in dependence on the quantity of added master-batch, master-batch formulation reliable with foodstuffs.

Proceeding from this point, it is the object of the present invention to propose a new master-batch which has good compatibility particularly with the base material, and leads to increased slip properties in the articles produced. The articles produced should further have an anti-blocking function. It is also desirable that the product should be resistant to sterilisation.

This object is achieved by providing a packaging film comprising a polyamide base and 1–8% of a master-batch, said master batch comprising: 60 to 95% by weight of compolyamide PA6/12 as a polyamide carrier material; 2 to 20% by weight of NN'ethylene-bis-fatty acid amide with a C18 fatty acid proportion of at least 60% as a slip additive; 1.5 to 10% by weight of micronized $Mg_3Si_nO_{10}(OH)_2$ as a nucleation agent; and 1.5 to 10% by weight of calcium carbonate as an anti-blocking agent. Additional advantageous developments are also disclosed herein.

Accordingly, the master-batch according to the invention contains 60 to 95% by weight of a polyamide carrier material and 2 to 20% by weight of NN'ethylene-bis-fatty amide, and proportions of additive materials supplemented up to 100% by weight.

It has become surprisingly apparent that by means of the end-products from the formulations described above, the desired properties such as slippery films, sterilisable films and anti-blocking properties can be achieved. In addition, a factor which could not be foreseen by the person skilled in the art is that all the properties may be realised simultaneously. It is thus possible for the first time, with the master-batch according to the invention, favourably to influence the end-product in a controlled manner with respect to various properties.

All the currently available polyamide types may in themselves be used as a polyamide carrier material. Preferably copolyamide PA 6/12, polyamide 6, polyamide 12 or amorphous polyamide such as polyamide 6I/6T are used as a polyamide carrier material. It has proved particularly favourable if copolyamides PA 6/12 with melting temperatures of 130 to 150° C. are used as a polyamide carrier material. A decisive advantage of this copolyamide 6/12 is that in these polymers the melting point can be adjusted by the relationship of Caprolactam to Laurinlactam within a wide range, and thus a universal degree of application can be achieved.

An essential factor in the subject-matter of the Application is that 60 to 95% by weight of the polyamide carrier material described above is used exclusively in combination with a specially selected modified synthetic fatty amide wax, i.e. with 2 to 20% by weight of NN'ethylene-bis-fatty amide. It has proved advantageous if an NN'ethylene-bis-fatty amide is used with a C 18 fatty acid proportion of at least 60%, preferably with a C 18 fatty acid proportion of at least 90%. Only in this way is it possible for the films produced by the master-batch according to the invention to possess outstanding slip properties.

The master-batch formulation according to the invention, as described above, in addition contains proportions supplemented up to 100% by weight of additive materials, such for example as nucleation aids, anti-blocking aids, anti-oxidant aids and mastication aids. In this case the use of 1.5 to 10% Microtalk is preferred as a nucleation agent, and 1.5 to 10% calcium carbonate as an anti-blocking agent.

A particularly preferred master-batch formulation comprises 80 to 85% by weight PA 6/12, 5 to 10% by weight of NN'ethylene-bis-fatty amide, 5% by weight Microtalk and 5% by weight calcium carbonate. The abovementioned formulation leads in particular to products which have all the required properties.

The master-batches were produced on a commercially conventional double-shaft extruder, e.g. of the company Werner+Pfleiderer, Germany. The low-melting-point PA 6/12 carrier material, which required clearly lower extrusion temperatures than the polyamides with a higher melting point, proves particularly favourable. This results in low thermal stress on the admixed additives, so that they retain their efficiency to a maximum extent.

EXAMPLES

Production of Master-batches

The master-batches were produced on a commercially available double-shaft extruder (ZSK 30) of the company Werner+Pfleiderer. The polyamide carrier material was inserted directly into the intake, whilst the pre-mixed additives were metered in only in the third zone via a "side-feeder". This arrangement was selected in order to expose additives to as little thermal stress as possible. The use of low-melting-point copolyamides 6/12 as a carrier material proved particularly advantageous, as these can be processed at considerably lower extrusion temperatures of 160 to 180° C.

The precise composition of the master-batches which were used for producing the various films, and the subsequent tests, is laid out in Table 1. The later title of the film corresponds to the title of the mater-batch used.

TABLE 1

Master-batch Formulation for the Production of Test Films

| Composition | Formulations (% by wt.) | | | |
| --- | --- | --- | --- | --- |
| | B | C | D | E |
| Polyamide 6/12 | 80 | 85 | 94.5 | — |
| Polyamide 6 | — | — | — | 80 |
| NN'ethylene-bis-stearamide | 10 | 5 | 2.5 | 10 |
| Microtalk | 5 | 5 | 1.5 | 5 |
| Calcium carbonate | 5 | 5 | 1.5 | 5 |

When PA-6 is used as a carrier material the conventional processing temperatures of 250 to 270° C. were used.

Production of Mono Flat Films

The master-batches produced according to the invention were added in concentrations of 1 to 8% to PA 6 (Grilon F34, EMS-CHEMIE AG), PA6 and master-batch always being supplemented to 100%.

The preferred composition came to 98% of the PA basic material and 2% of the master-batch.

The mixtures were processed on a flat film extruder (30-flat film extruder of the firm Collin, D=30 mm: L/D=25), the following process parameters being observed.

| | |
| --- | --- |
| cylinder temperature: | 260 to 270° C. |
| rotational speed: | 40 to 60 rpm |
| mass pressure: | 50 bar |
| pull-off speed: | 5 to 10 m/min. |
| chillroll temperature: | 95° C. |

The following PA 6 films were produced for the comparative measurements:

| | | |
| --- | --- | --- |
| A | 2% | commercially- avaialable masterbatch Reed Spectrum of the company Reed Spectrum, Holden, MA-01520-1849 USA |
| B | 2% | masterbatch according to the invention, according to masterbatch recipe B |
| C | 2% | masterbatch according to the invention, according to masterbatch recipe C |
| D | 2% | masterbatch according to the invention, according to masterbatch recipe D |
| E | 2% | masterbatch according to the invention, according to masterbatch recipe E |
| F | | without added masterbatch. |

All the films were produced under identical conditions.

RESULTS

Slip Properties

The slip properties were determined in accordance with DIN 53 375. In accordance with this regulation a film portion of 100 mm×100 mm was drawn over a steel plate with a specific roughness at a fixed speed of 100 mm/min. A 50 $\mu$m flat film was measured: Chillroll-temperature 95° C., temperature setting 260 to 270° C. The required tensile force was then converted into a dimension-free relevant coefficient of friction.

The measurement results are given in FIG. 1.

The results clearly show that the low coefficient of friction for films of about 0.2 required by the automatic packaging machine industry can only be produced with film B, manufactured with 2% of the master-batch according to the invention. The results also show the influence of the NN'ethylene-bis-stearamide in the master-batch on the coefficient of friction. With reducing quantities of the NN'ethylene-bis-stearamides in the master-batch, the coefficient of friction is also correspondingly impaired.

Resistance to Sterilisation

The slip agent used according to the invention, NN'ethylene-bis-stearamide, has a melting point of about 140° C. The conventional sterilisation conditions are carried out in steam at 121° C. for 30 minutes.

None of the sterilised films produced according to the invention showed any blooming.

Anti-blocking Function

In order to test the anti-blocking properties, various polyamide and copolyamide films were produced with the master-batch type B according to the invention on a Collin flat film system and on a three-layer blown film system of the company Alpine.

Table 2 shows the concentrations of master-batch necessary for the various polyamide films, so that production can be effected without difficulty.

TABLE 2

Required Anti-blocking Master-batch Concentration for Production of various PA Films

| Polyamide film type | Required masterbatch concentration |
| --- | --- |
| PA6 | 1 to 2% |
| PA6/12 | 3 to 4% |

The results in Table 2 show that the quantity of the required master-batch additive is dependent on the type of polyamide film produced. A higher addition of master-batch is required for the production of copolyamide film than for a homopolyamide 6.

Compatibility

In order to test the compatibility, comparative measurements with respect to mechanical properties and oxygen gas permeation values were carried out on the films B, E and F. As can be seen from the results in Table 3, in no case was a negative influence ascertained on the properties as a result of the master-batch additive according to the invention.

With reference to transparency and oxygen barrier values of the films, in fact an improvement was noticed. The improved transparency can be explained by a more uniform crystallinity.

TABLE 3

Influence of the Master-batch Additive according to the Invention on the Mechanical Properties of the Oxygen Permeability of PA-6 Films

| Film Properties | Unit | Film B (with 2% MB) | Film E (with 2% MB) | Film F (without MB) |
| --- | --- | --- | --- | --- |
| Tear Strength | N/mm$^2$ | 101 | 102 | 100 |
| Extension at tear | % | 458 | 460 | 460 |
| O$_2$ barrier (23° C./85% r.F.) | cm$^3$/m$^2$ 24h bar | 42 | 45 | 70 |

Test Standards

Tear strength and expansion at tear were determined according to ISO 1184. Oxygen permeability was measured in terms of ASTM D 3985.

What is claimed is:

1. A packaging film comprising a polyamide base and 1–8% of a master-batch, said master batch comprising:
   60 to 95% by weight of copolyamide PA6/12 as a polyamide carrier material;
   2 to 20% by weight of NN'ethylene-bis-fatty acid amide with a C18 fatty acid proportion of at least 60% as a slip additive;
   1.5 to 10% by weight of micronized $Mg_3Si_nO_{10}(OH)_2$ as a nucleation agent; and
   1.5 to 10% by weight of calcium carbonate as an anti-blocking agent 2. The packaging film according to claim 1, wherein the copolyamide PA 6/12 has a melting temperature of 130 to 150° C.

3. The packaging film according to claim 1, wherein the master-batch is contained in flat films, blown films, tubes, blow-molded or injection-molded articles.

4. The packaging film according to claim 1, wherein the master-batch is contained in mono-films or multi-layer films.

5. The packaging film according to claim 1, further comprising additive materials which are selected from the group consisting of nucleation agents, anti-blocking aids, anti-oxidant aids, mastication aids and mixtures thereof.

6. The packaging film according to claim 1, wherein the NN'ethylene-bis-fatty acid amide has a C 18 fatty acid proportion of at least 90%.

7. The packaging film according to claim 1, wherein the weight percentage of the copolyamide 6/12 carrier material in the master batch is 80 to 85% and the weight percentage of the NN'ethylene-bis-fatty acid amide slip additive is 5 to 10%.

* * * * *